(No Model.)
G. W. O'HARRA.
GALVANIC BATTERY.
No. 267,577. Patented Nov. 14, 1882.
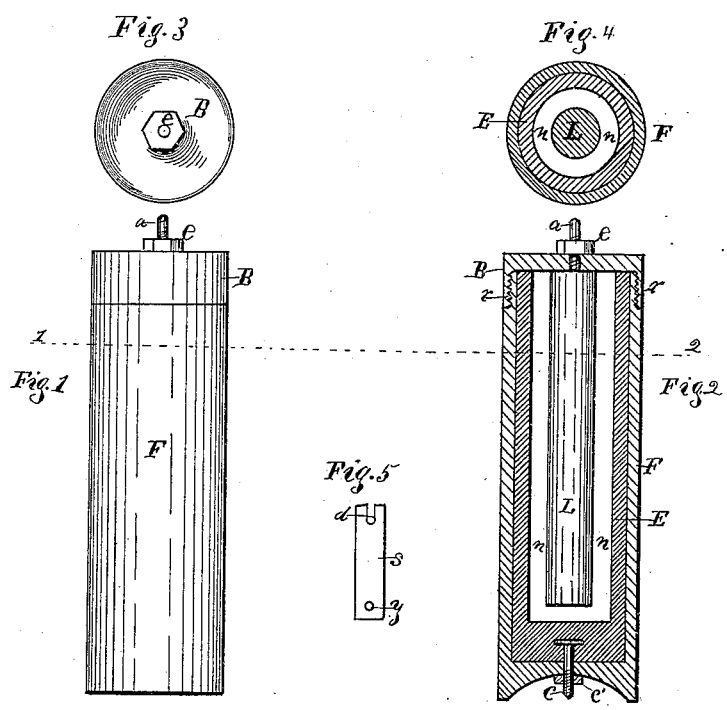
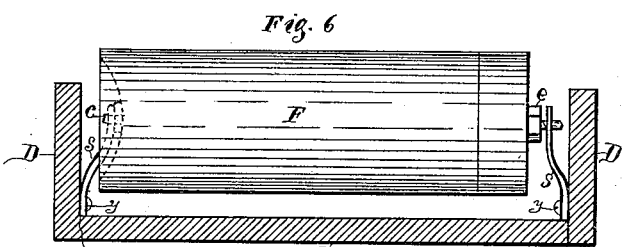
Attest.
John C. Perkins
Frank C. Gibbs
Inventor.
George W. O'Harra
By Lucius C. West
Atty.

UNITED STATES PATENT OFFICE.

GEORGE W. O'HARRA, OF KALAMAZOO, MICHIGAN, ASSIGNOR OF ONE-HALF TO JOHN A. HOEDEMAKER, OF SAME PLACE.

GALVANIC BATTERY.

SPECIFICATION forming part of Letters Patent No. 267,577, dated November 14, 1882.

Application filed April 25, 1882. (No model.)

*To all whom it may concern:*

Be it known that I, GEORGE W. O'HARRA, a citizen of the United States, residing at Kalamazoo, county of Kalamazoo, State of Michigan, have invented a new and useful Galvanic Battery, of which the following is a specification.

My invention has for its object certain improvements in the construction of galvanic batteries, for the purposes hereinafter set forth.

The battery to which my invention relates is especially intended for use in a portable hand-cabinet.

In the drawings forming a part of this specification, Figure 1 is a side elevation of the battery-case; Fig. 2, a longitudinal section, showing the internal construction; Fig. 3, top view of Fig. 1; Fig. 4, cross-section on line 1 2 in Fig. 1; Fig. 5, detached part of Fig. 6, and Fig. 6 shows the battery case or cell located in the cabinet.

In the construction of my battery, E is a cylindrical cup or vessel, either zinc or carbon, placed within a rubber cup, F, adapted to receive it, as shown in Fig. 2. These cups are covered by means of a cover, B, also made of rubber, which is screwed on the rubber cup F. In the cup E is suspended a stick of carbon or zinc, L. When cup E is made of carbon stick L is made of zinc, and vice versa. The generating-liquid used in the battery-cell is placed in cup E around stick L in the space $n$ $n$.

By forming the zinc and carbon in the manner above described, and thus associating them with the generating-fluid, a greater surface of said parts is presented in a given size battery to the action of said fluid. Other advantages are, less danger of leakage and greater convenience in construction and operation.

The poles $a$ and $c$ of the battery are located in each end and form axial bearings to support the cylindrical cell in a horizontal and a revoluble position in the cabinet $d$, Fig. 6. Pole $c$ is embedded secure in the inclosed end of cup E and extends through the corresponding end of cup F, and pole $a$ is secured in the end of stick L and extends through cover B, where it is held secure by nut $e$. Nut $c'$ on pole $c$ secures cup E in cup F. The parts $a$ $c$ thus serve the triple purpose of poles to the battery, a means of securing the zinc and carbon in place, and as axes of the cups or cell. This battery-cylinder is supported in the cabinet D, Fig. 6, by means of two supports, $s$ $s$, made something in the form of a letter S, by locating poles $a$ $c$ in the open slots $d$ in the upper end of said supports. By this means the cell may be revolved by passing the palm of the hand transversely over it when desiring to agitate the generating-fluid to increase the electrical current. The supports $s$ $s$ also serve as positive and negative electrodes, with which wires $e'$ $e'$ may be attached. The inclosed end of cup F is formed concave, as in Figs. 2 and 6, in order that said end may be provided with pole and axis $c$ and still admit of setting the cell on the end, as in Fig. 1, when filling it with liquid.

The revoluble cell is described as being cylindrical; but it may be any form desired, which will not interfere with its being revolved on its axis.

Having thus described my invention, what I claim as new is—

1. In a galvanic battery, a cell composed of a cup of zinc or carbon located within a rubber cup, said inner cup being provided with an axis-pole secured in its inclosed end and extending out through the end of the rubber cup, the opposite end of the cell also being provided with an axis-pole secured in the end of the stick of zinc or carbon and extending out through the cover, in combination with a cabinet provided with axial supports, all substantially as set forth, for the objects specified.

2. The combination, with the rubber cup, having the concave recess in the inclosed end, the inner cup, having the pole secured thereto and passing out through the end of the rubber cup into said concave recess, the opposite end of the cell also having a pole serving as an axis, of a cabinet provided with the S-shaped supports at each end of the cell, all substantially as described and shown, for the objects stated.

3. The combination, with a cabinet provided with axial supports, of a cell having an axis at each end revolubly located in said axial supports, substantially as described.

4. A cell having an axis at each end, in combination with a cabinet having axial supports, provided with open slots in the upper end, whereby the cell is both detachably and revolubly supported by said axial supports, substantially as set forth.

5. A revoluble cell provided with axial bearings at each end, said cell having a concavity in one end, substantially as described and shown.

GEORGE W. O'HARRA.

Witnesses:
FRANK C. GIBBS,
JOHN W. ROWLEY,